(12) United States Patent
Cheng

(10) Patent No.: US 9,639,588 B2
(45) Date of Patent: May 2, 2017

(54) OPERATION METHOD AND APPARATUS FOR DATA STORAGE SYSTEM

(71) Applicant: Huawei Technologies Co., Ltd., Shenzhen, Guangdong (CN)

(72) Inventor: Shi Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 14/093,124

(22) Filed: Nov. 29, 2013

(65) Prior Publication Data

US 2014/0089259 A1 Mar. 27, 2014

Related U.S. Application Data

(63) Continuation of application No. PCT/CN2011/075077, filed on Jun. 1, 2011.

(51) Int. Cl.
G06F 17/30 (2006.01)
G06F 7/00 (2006.01)
G06F 3/06 (2006.01)

(52) U.S. Cl.
CPC ........ G06F 17/30575 (2013.01); G06F 3/061 (2013.01); G06F 3/067 (2013.01); G06F 3/0659 (2013.01)

(58) Field of Classification Search
CPC .. G06F 17/30575; G06F 3/061; G06F 3/0659; G06F 3/067
See application file for complete search history.

(56) References Cited

U.S. PATENT DOCUMENTS 5,742,792 A * 4/1998 Yanai ................... G06F 3/0601
710/1
6,931,496 B2 * 8/2005 Chen ................... G06F 12/0817
711/144
(Continued)

FOREIGN PATENT DOCUMENTS

CN 1447257 A 10/2003
CN 101753608 A 6/2010
(Continued)

OTHER PUBLICATIONS

DeCandia et al., "Dynamo: Amazon's Highly Available Key-value Store," SOSP '07, Stevenson, Washingtion, USA, ACM (Oct. 14-17, 2007).

*Primary Examiner* — Jeffrey A Burke
(74) *Attorney, Agent, or Firm* — Leydig, Voit & Mayer, Ltd.

(57) ABSTRACT

An operation method and apparatus for a data storage system are provided, which relate to the field of data storage and enhance efficiency of a read operation on distributed stored data. The method includes: receiving, by a data node, a data operation message, where the data operation message carries a data operation type and a data object of an operation; querying a state parameter of the data object, where the state parameter is allocated to the data node by a management node, and is used to indicate an update state of the data object, and the update state includes a synchronous state, a semi-synchronous state and an asynchronous state; and if the state parameter is the synchronous state and the operation type is a read operation, reading the data object stored by the data node. Embodiments of the invention are used to operate data in a distributed data storage system.

28 Claims, 7 Drawing Sheets

(56) References Cited

U.S. PATENT DOCUMENTS

| | | | |
|---|---|---|---|
| 6,950,820 B2 | 9/2005 | Bae | |
| 7,668,878 B2* | 2/2010 | Arora | G06F 17/30212 |
| | | | 707/610 |
| 7,747,561 B1* | 6/2010 | Gupta | G06F 17/30578 |
| 7,761,421 B2* | 7/2010 | Frolund | G06F 11/1662 |
| | | | 707/637 |
| 7,788,346 B2 | 8/2010 | Kumar et al. | |
| 7,827,144 B1 | 11/2010 | Saito et al. | |
| 8,224,860 B2* | 7/2012 | Starkey | G06F 17/30575 |
| | | | 707/792 |
| 8,443,229 B2* | 5/2013 | Gardner | G06F 11/1443 |
| | | | 714/6.1 |
| 8,538,923 B2 | 9/2013 | Xue et al. | |
| 8,666,939 B2* | 3/2014 | O'Krafka | G06F 17/30581 |
| | | | 707/615 |
| 9,110,724 B2* | 8/2015 | Balakrishnan | G06F 9/505 |
| 9,218,404 B2* | 12/2015 | Chen | G06F 17/30575 |
| 2001/0014893 A1 | 8/2001 | Boothby | |
| 2001/0039548 A1* | 11/2001 | Shinkai | G06F 17/30194 |
| 2003/0167420 A1* | 9/2003 | Parsons | G06F 11/1482 |
| | | | 714/10 |
| 2003/0191906 A1 | 10/2003 | Chen et al. | |
| 2007/0208790 A1 | 9/2007 | Reuter et al. | |
| 2009/0083441 A1* | 3/2009 | Clark | H04L 67/1095 |
| | | | 709/248 |
| 2009/0313311 A1* | 12/2009 | Hoffmann | G06F 11/2094 |
| 2010/0106914 A1 | 4/2010 | Krishnaprasad et al. | |
| 2011/0289056 A1* | 11/2011 | Xue | H04L 12/24 |
| | | | 707/638 |

FOREIGN PATENT DOCUMENTS

| | | |
|---|---|---|
| CN | 101753609 A | 6/2010 |
| CN | 101826073 A | 8/2010 |
| CN | 101964820 A | 2/2011 |

* cited by examiner

| Data node | Data | State parameter |
|---|---|---|
| Data node 1 | Data 1 | Synchronous state |
| Data node 1 | Data 2 | Semi-synchronous state |
| Data node 2 | Data 1 | Synchronous state |
| Data node 2 | Data 4 | Asynchronous state |
| Data node 3 | Data 2 | Synchronous state |
| Data node 3 | Data 3 | Synchronous state |
| Data node 4 | Data 2 | Asynchronous state |
| Data node 4 | Data 4 | Synchronous state |

FIG. 9

| Data node | account group | State parameter |
|---|---|---|
| ... | ... | ... |
|  |  |  |
|  |  |  |
|  |  |  |

FIG. 10

OPERATION METHOD AND APPARATUS FOR DATA STORAGE SYSTEM

CROSS-REFERENCE TO RELATED APPLICATIONS

This application is a continuation of International Patent Application No. PCT/CN2011/075077, filed on Jun. 1, 2011, which is hereby incorporated by reference in its entirety.

TECHNICAL FIELD

The present invention relates to the field of data storage, and in particular, to an operation method and apparatus for a data storage system.

BACKGROUND

A distributed data storage system is a storage system composed of multiple storage devices interconnected by a network. In the system, data is backed up on multiple data nodes. Data nodes of a conventional distributed data storage system usually include multiple master nodes; each master node saves one part of all data, and is connected to a group of slave nodes. When reading data, a user directly executes a data read operation on a master node; and when writing the data, the user executes a data write operation on the master node, and copies the data from the mater node to the slave nodes, so that the slave nodes save the same data copies as the master node connected to the slave nodes. When the master node fails, one slave node is upgraded to the master node through master-slave node switching, thereby ensuring normal read and write operations. In the conventional storage system of the master and slave nodes, each slave node must be configured with hardware with performance similar to the master node, so as to replace a failed master node to work, which leads to exorbitant hardware cost. In addition, in a background that the current network is usually loosely networked, connection interruptions or timeouts often occur in nodes in the network, thereby resulting in frequent switching between the master and slave nodes, so the system performance is affected.

To solve the problems of the conventional storage system of the master and slave nodes, the prior art provides an (N, W, R) strategy based management solution. This solution cancels a concept of the master and slave nodes, and each data node saves one part of all the data; moreover, for certain data X, N data nodes are allocated as copy nodes for storing the data X, that is, the data X has N copies saved in the data storage system. When a write operation is performed on the data X, this write operation can be ended only after W copy nodes complete the write operation on the data; and when a read operation is performed on the data X, the data X must be read out in R copy nodes. N, W and R satisfy a relationship of W+R>N, so as to ensure that at least one of the read R data is the latest version.

During implementation of the above solution, the inventor finds that the prior art at least has the following problems: first, in the (N, W, R) strategy based management solution, the latest version of the data can determined only after the read operation is performed on the R copy nodes, so the efficiency of the read operation is very low. Furthermore, the data storage system usually needs to support a complicated condition query performed on the data, that is, selecting, through data traversing, data that complies with a specified query condition, and executing computation or write operation on the selected data; while in the (N, W, R) strategy based management solution, any data has copies saved in N copy nodes; as a result, when the complicated condition query is performed, for each data, the R copy nodes must be traversed and then the data of the latest version can be determined, so the operating quantity of data traversing is extremely large, and it is difficult for implementation in actual application.

SUMMARY

Embodiments of the present invention provide an operation method and apparatus for a data storage system, which enhance efficiency of a read operation on distributed stored data.

To achieve the above objective, the embodiments of the present invention adopt the following technical solutions.

An operation method for a data storage system includes:

receiving, by a data node, a data operation message, where the data operation message carries a data operation type and a data object of an operation;

querying a state parameter of the data object, where the state parameter is allocated to the data node by a management node, and is used to indicate an update state of the data object, and the update state includes a synchronous state, a semi-synchronous state and an asynchronous state; and if the state parameter is the synchronous state and the operation type is a read operation, reading the data object stored by the data node.

An operation apparatus for a data storage system includes:

an operation message receiving unit, configured to receive a data operation message, where the data operation message carries a data operation type and a data object of an operation;

a state parameter querying unit, configured to query a state parameter of the data object, where the data parameter is allocated to a data node by a management node, and is used to indicate an update state of the data object, and the update state includes a synchronous state, a semi-synchronous state and an asynchronous state; and a data reading unit, configured to, when the state parameter is the synchronous state and the operation type is a read operation, read the data object stored by the data node.

In the operation method and apparatus for a data storage system provided by the embodiments of the present invention, a state parameter is allocated to data saved in a data node, and the data with the state parameter being a synchronous state is read out as the latest data, thereby avoiding an operation of reading data from R nodes in the prior art, and enhancing the efficiency of a read operation.

BRIEF DESCRIPTION OF DRAWINGS

FIG. 9 is a schematic diagram of a node state table of a data node 1 of the distributed data storage system shown in FIG. 8; and FIG. 10 is a schematic diagram of a node state table based on an account group.

DETAILED DESCRIPTION OF EMBODIMENTS

There is no distinction between a master node and a slave node in a distributed data storage system in embodiments of the technical solution of the present invention, and each data node saves one part of all data.

Generally, a data item stored in the distributed data storage system has four attributes: account, key, value and version. Key is a unique identification of the data item; value is content of the data item; version is the latest version of the data item; and account is an account number of the data item, and the same account number may be allocated to different data items.

For the distributed data storage system in which each data node merely saves one part of all the data, at the beginning of establishing the system, all accounts may be divided into several account groups (account group) in advance, and all the data nodes save data by taking the account group as a unit. For example, for a certain data item X, if an account of the data item X is account_X, account_X must belong to a certain account group. Assuming that the account group to which the account_X belongs is group_X, a data node saving data X further saves data items corresponding to all accounts in group_X. For each account group, copies of data of each account group is saved by N data nodes, where N is referred to as a copy threshold and N is less than the total number of the data nodes. Therefore, each data item in the distributed data storage system has copies saved in the N data nodes.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Embodiment 1

Figure 1:
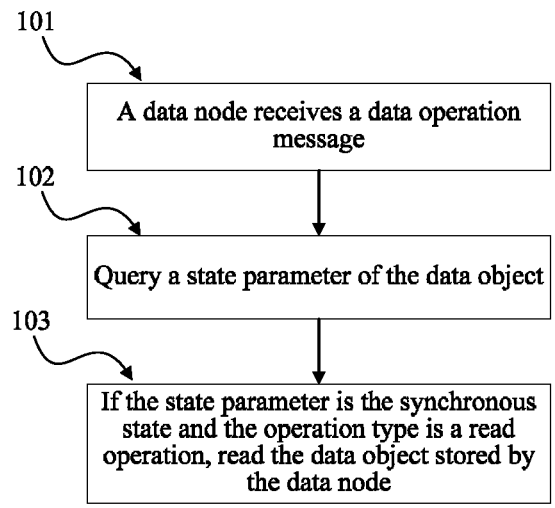
FIG. 1 is a flow chart of an operation method for a data storage system in Embodiment 1 of the present invention.

An embodiment of the present invention provides an operation method for a data storage system; as shown in FIG. 1, the method includes the following steps.

101: A data node receives a data operation message.

The data operation message is sent to the data node by a client, and the data operation message carries a data operation type and a data object of an operation.

102: Query a state parameter of the data object.

After receiving the data operation message, the data node executes an operation of querying the state parameter of the stored data object.

The state parameter is allocated to the data node by a management node, and is used to indicate an update state of the data object; the update state includes a synchronous state, a semi-synchronous state and an asynchronous state. For data updated to the latest version, its state parameter is the synchronous state; while for data not updated to the latest version, its state parameter is the semi-synchronous state or the asynchronous state. Specifically, an unspecified state may also be set in the state parameter, and is used to indicate an exceptional case in which what may occur is neither the synchronous state nor the semi-synchronous or asynchronous state.

103: If the state parameter is the synchronous state and the operation type is a read operation, read the data object stored by the data node.

When acquiring that the state parameter is the synchronous state, the data node queries the data operation type in the data operation message. If the data operation type is the read operation, the data node executes the read operation on the data object with the state parameter being the synchronous state, and returns a read result to the client.

Figure 2:
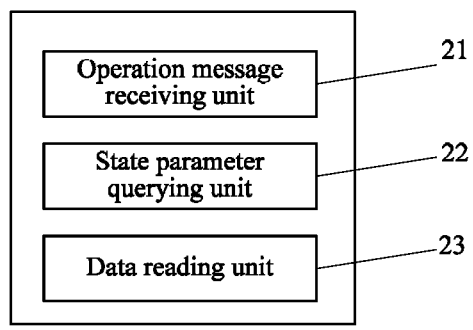
FIG. 2 is a block diagram of an operation apparatus for a data storage system in Embodiment 1 of the present invention.

The embodiment of the present invention further provides an operation apparatus for a data storage system; as shown in FIG. 2, the apparatus includes: an operation message receiving unit 21, a state parameter querying unit 22 and a data reading unit 23.

The operation message receiving unit 21 is configured to receive a data operation message, where the data operation message carries a data operation type and a data object of an operation. The state parameter querying unit 22 is configured to query a state parameter of the data object, where the data parameter is allocated to a data node by a management node, and is used to indicate an update state of the data object, and the update state includes a synchronous state, a semi-synchronous state and an asynchronous state. The data reading unit 23 is configured to, when the state parameter is the synchronous state and the operation type is the read operation, read the data object stored by the data node.

In the operation method and apparatus for a data storage system provided by the embodiments of the present invention, a state parameter is allocated to data saved in a data node, and the data with the state parameter being a synchronous state is read out as the latest data, thereby avoiding an operation of reading data from R nodes in the prior art, and enhancing the efficiency of a read operation.

Embodiment 2

Figure 3:
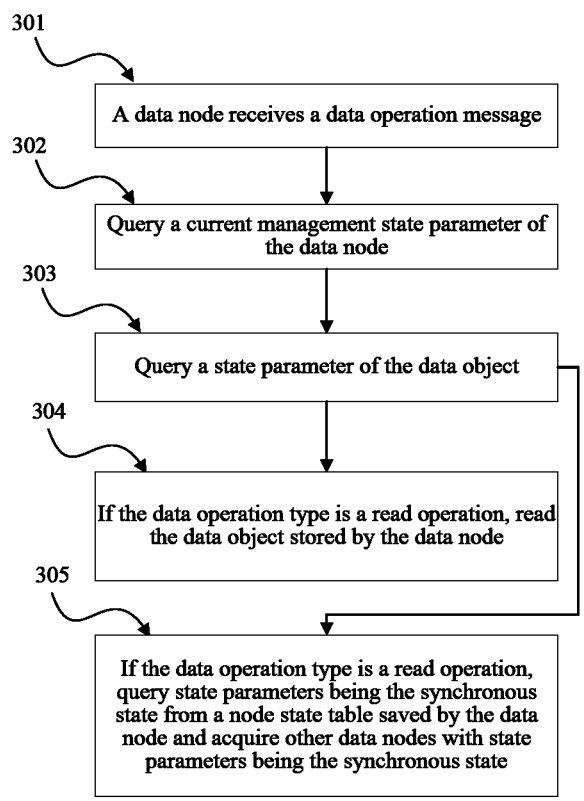
FIG. 3 is a flow chart of an operation method when an operation type is a read operation in Embodiment 2 of the present invention.

An embodiment of the present invention provides an operation method for a data storage system; as shown in FIG. 3, the method includes the following steps.

301: A data node receives a data operation message.

The data operation message is sent to the data node by a client, and the data operation message carries a data operation type and a data object of an operation.

If the data node does not store the data object carried in the data operation message, the data node returns an exception message to the client, so that the client resends the data operation message to another data node.

302: Query a current management state parameter of the data node.

When the management state parameter of the data node is a normal state, execute step 303; and when the management state parameter of the data node is a connection interruption state, end a current data operation.

303: Query a state parameter of the data object.

The state parameter is allocated to the data node by a management node, including a synchronous state, a semi-synchronous state and an asynchronous state. For data updated to the latest version, its state parameter is the synchronous state; while for data not updated to the latest version, its state parameter is the semi-synchronous state or the asynchronous state. Specifically, an unspecified state may also be set in the state parameter, and is used to indicate an exceptional case in which what may occur is neither the synchronous state nor the semi-synchronous or asynchronous state.

After the state parameter of the data object is queried, if the state parameter is the synchronous state, turn to step 304; if the state parameter is the semi-synchronous state or the asynchronous state, turn to step 305.

304: If the data operation type is a read operation, read the data object stored by the data node.

The data node reads the data object stored by the data node itself, and returns a read result to the client.

305: If the data operation type is a read operation, query state parameters being the synchronous state from a node state table saved by the data node and acquire other data nodes with the state parameters being the synchronous state.

Each data node saves a node state table, which is used to record data saved by each data node and a state parameter corresponding to the saved data. By querying the node state table, the data node acquires the other data nodes with the state parameters of data being the synchronous state, so that the other data nodes are notified to perform the read operation.

Figure 8:
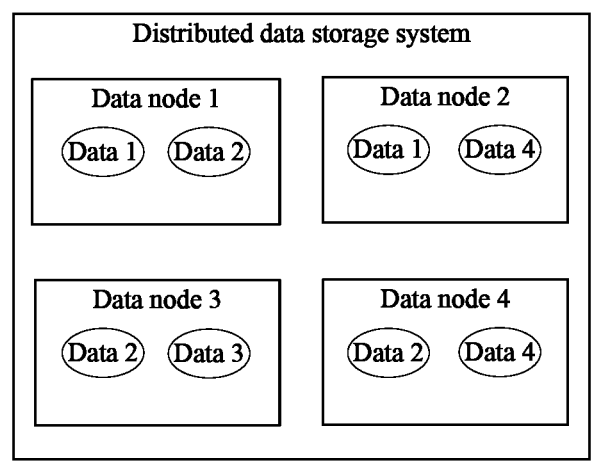
FIG. 8 is a structural diagram of a distributed data storage system in Embodiment 2 of the present invention.

For example, in a distributed data storage system as shown in FIG. 8, data 1 to data 4 have different storage distributions in a data node 1 to a data node 4. A node state table of the data node 1 may be a case as shown in FIG. 9. The node state table in the FIG. 9 records storage situations of the data node 1 to the data node 4. Considering that data updating of the whole distributed data storage system may not be fully real-time, a case of other data nodes (a data node 2 to the data node 4) recorded in the node state table of the data node 1 may be inconsistent with an actual case. FIG. 8 and FIG. 9 describe an extremely simplified case; because the a data amount in the distributed data storage system is usually very huge, it is very difficult to record each data as shown in FIG. 9. A data node in an actual distributed data storage system saves data by taking an account group as a unit; therefore, a node state table of the data node usually records a state parameter of the data by taking the account group as the unit, as shown in FIG. 10. In this way, all data under one account group saved by one data node has the same state parameters. A state parameter in a node state table of a data node mentioned below in the embodiment of the present invention may be regarded as a state parameter allocated by taking each data item as a unit, and may also be regarded as a state parameter allocated by taking each account group as a unit. In general, in a distributed data storage system with a huge data amount, allocating the state parameter by taking account group as the unit is a preferred solution.

306: Send a read operation message to one data node among the other data nodes.

The read operation message includes the data object; after receiving the read operation message, the other data node reads the data object stored by the other data node itself, and returns a read result to the client.

Figure 4:
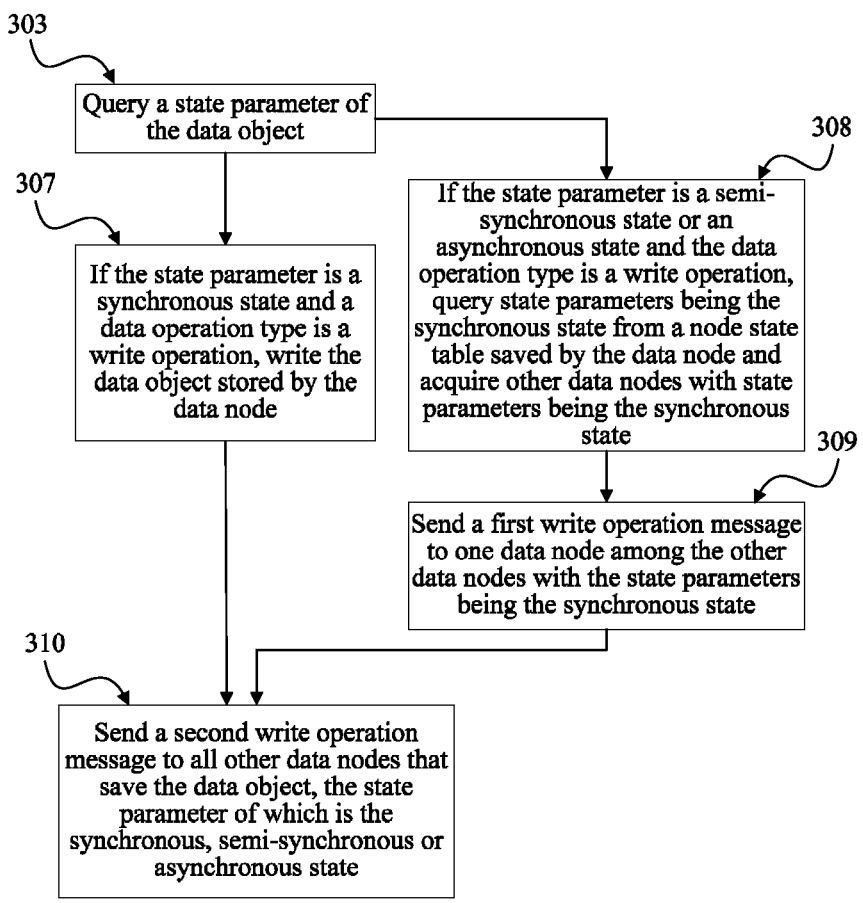
FIG. 4 is a flow chart of an operation method when an operation type is a write operation in Embodiment 2 of the present invention.

Furthermore, for a case that the data operation type is a write operation, as shown in FIG. 4, the method further includes the following steps.

303: Query a state parameter of the data object.

After the state parameter of the data object is queried, if the state parameter is the synchronous state, turn to step 307; if the state parameter is the semi-synchronous state or the asynchronous state, turn to step 308.

307: If the state parameter is the synchronous state and the data operation type is the write operation, write the data object stored by the data node.

308: If the state parameter is the semi-synchronous state or the asynchronous state and the data operation type is the write operation, query state parameters being the synchronous state from a node state table saved by the data node and acquire other data nodes with the state parameters being the synchronous state.

309: Send a first write operation message to one data node among the other data nodes with the state parameters being the synchronous state.

The first write operation message includes the data object; after receiving the first write operation message, the one data node performs a write operation on the data object stored by the one data node itself.

310: Send a second write operation message to all other data nodes which save the data object, the state parameter of which is the synchronous, semi-synchronous or asynchronous state.

After completing a write action in step 307, and after completing the write action in step 309, the data node having completed the write action or the one data node among the other data nodes with the state parameters being the synchronous state sends the second write operation message to all the other data nodes which save the data object, the state parameter of which is the synchronous, semi-synchronous or asynchronous state, so that all the other data nodes write the data object, thereby implementing an update to the data object by the whole distributed data storage system.

Examples are given below to illustrate the read operation and the write operation. It is assumed that in the distributed data storage system, data nodes A, B, C and D store data a.

If the data node A receives a data operation message sent by the client and the data operation message requires a read operation on data a, when the data node A queries its own node state table for a state parameter of the data a stored by the data node A itself and finds that the state parameter is the synchronous state, the data node A directly reads the data a stored by the data node A itself when the data node A queries its own node state table for a state parameter of the data a stored by the data node A itself and finds that the state parameter is the semi-synchronous state or the asynchronous state, the data node A sends a read operation message to one data node (it may be assumed that the one data node is the data node C) among other data nodes which are recorded in the node state table of the data node A and save data a whose state parameters are the synchronous state, so that the data node C reads the data a.

If the data node A receives a data operation message sent by the client and the data operation message requires a write operation on the data a, when the data node A queries its own node state table for a state parameter of the data a stored by the data node A itself and finds that the state parameter is the synchronous state, the data node A writes the data a stored by the data node A itself; when the data node A queries its own node state table for a state parameter of the data a stored by the data node A itself and finds that the state parameter is the semi-synchronous state or the asynchronous state, the data node A sends the first write operation message to one data node (it may be assumed that the one data node is the data node C) among other data nodes which are recorded in the node state table of the data node A and save data a whose state parameters are the synchronous state, so that the data node C writes data a. After writing of the data a is completed, a second write operation message is further sent to all other data nodes (such as the data nodes B and D) which save data a whose state parameters are the synchronous, semi-synchronous or asynchronous state, so that the data nodes B and D also write data a stored by the data nodes themselves. In this way, all data nodes saving data a in the system perform a write action, thereby completing updating of the data a.

In a process of executing the read operation and the write operation, the data node further needs to analyze and handle an exceptional case.

For the read operation on the data, after sending out the read operation message, the data node waits for a response of the one data node in a first waiting time period.

If a management state exception message returned by the one data node because the management state parameter is the connection interruption state is received within the first waiting time period, the read operation message is sent to another data node among the other data nodes; if an update state exception message returned by the one data node because the state parameter of the data object is not the synchronous state is received within the first waiting time period, the state parameter of the data object of the one data node recorded in the node state table of the data node is updated; after updating of the data parameter is completed, the read operation message is sent to another data node among the other data nodes; if the response of the one data node is not received within the first waiting time period, the number of timeouts of the one data node is increased by 1 in a timeout record table stored by the data node.

For example, a data node M sends a read operation message to a data node M, so that the data node M performs the read operation on data n. That a data node N waits for the data node M to return an operation result within the first waiting time period includes the following several cases.

S1: The data node M completes the read operation and returns the operation result.

S2: If a management state parameter saved by the data node M itself is the connection interruption state, the data node M sends a management state exception message to the data node N. The data node N finds another data node, which saves the data n and the state parameter of which is the synchronous state, from its own node state table after receiving the management state exception message, and sends a read operation message to the data node.

S3: If after receiving the read operation message, the data node M finds, from its own node state table, that data n stored by the data node M itself is not in the synchronous state, the data node M returns an update state exception message to the data node N, where the update state exception message carries a state parameter of the data n stored by the data node M. After receiving the update state exception message, the data node N performs an update action on a state parameter of the data n stored by the data node M recorded in a node state table of the data node N. The update action includes:

S301: The data node N acquires the state parameter of the data n stored by the data node M from the update state exception message.

S302: Update the state parameter of the data n of the data node M recorded in the node state table to the state parameter acquired from the update state exception message. The state parameter of the data n of the data node M recorded in the node state table of the data node N is originally the synchronous state, but after the update state exception message is received and the state parameter is updated, the state parameter of the data n of the data node M recorded in the node state table of the data node N is changed to the semi-synchronous state or the asynchronous state.

If the data node N does not receive any response of the data node M within the first waiting time period, the number of timeouts of the data node M is increased by 1 in a timeout record table stored by the data node N.

For the write operation of the data, after sending out the first write operation message, the data node also waits in the first waiting time period for the response of the data node receiving the first write operation message. For handling for different responses, reference may be made to the examples given for the read operation.

For a case of sending the second write operation message, the data node waits for the response within another preset time period after sending out the second write operation message. It is assumed that another preset time period is a second waiting time period. For example, a data node P sends a second operation message to all the data nodes storing data p after completing a write operation on data p stored by the data node P itself. For a data node which saves data p whose state parameter is the synchronous or semi-synchronous state, the data node P sends a synchronous second write operation message; while for a data node which saves data p whose state parameter is the asynchronous state, the data node P sends an asynchronous second write operation message. It may be assumed that a data node Q receives the synchronous second write operation message and a data node R receives the asynchronous second write operation message. That the data node P waits for a returned operation result within the second waiting time period includes the following several cases.

S4: The data node P receives a write success message.

S5: The data node P receives an update state exception message.

The case of S5 is illustrated by taking the data node Q as an example. The data node Q queries a stored state parameter of the data p in its own node state table after receiving the synchronous second write operation message. If it is found that the state parameter of the data p is not the synchronous state or the semi-synchronous state, an update state exception message is returned to the data node P, where the update state exception message carries the state parameter of the data p stored by the data node Q (the state parameter carried in the update state exception message is the asynchronous state). The data node P performs an update action after receiving the update state exception message. The update action includes: the data node P updates the state parameter of the data p recorded in its own node state table to the asynchronous state according to the state parameter of the data p carried in the received update state exception message. After completing the update, the data node P sends an asynchronous second write operation message to the data node Q, and waits for a return result.

If the data node P does not receive any response of the data node Q within the second waiting time period, the number of timeouts of the data node Q is increased by 1 in a timeout record table stored by the data node P.

A handling process of the data node R receiving the asynchronous second write operation is similar to that of the data node Q. Furthermore, to enhance handling performance of the whole system, the data node P may end the waiting in the second waiting time period after receiving a write success message returned by the data node Q. In other words, after sending the second write operation message to all the data nodes storing the data p, and after receiving write success messages returned by all data nodes which save data p whose state parameters are the synchronous or semi-synchronous state, the data node P may end the current waiting in the second waiting time period, and goes on performing other operations, without the need of waiting for a write result returned by a data node which saves data p whose state parameter is the synchronous state. In this way, the less data nodes the distributed data storage system needs to wait for, the less exceptional operation cases may occur, so as to facilitate enhancement of the handling efficiency of the whole system.

Figure 5:
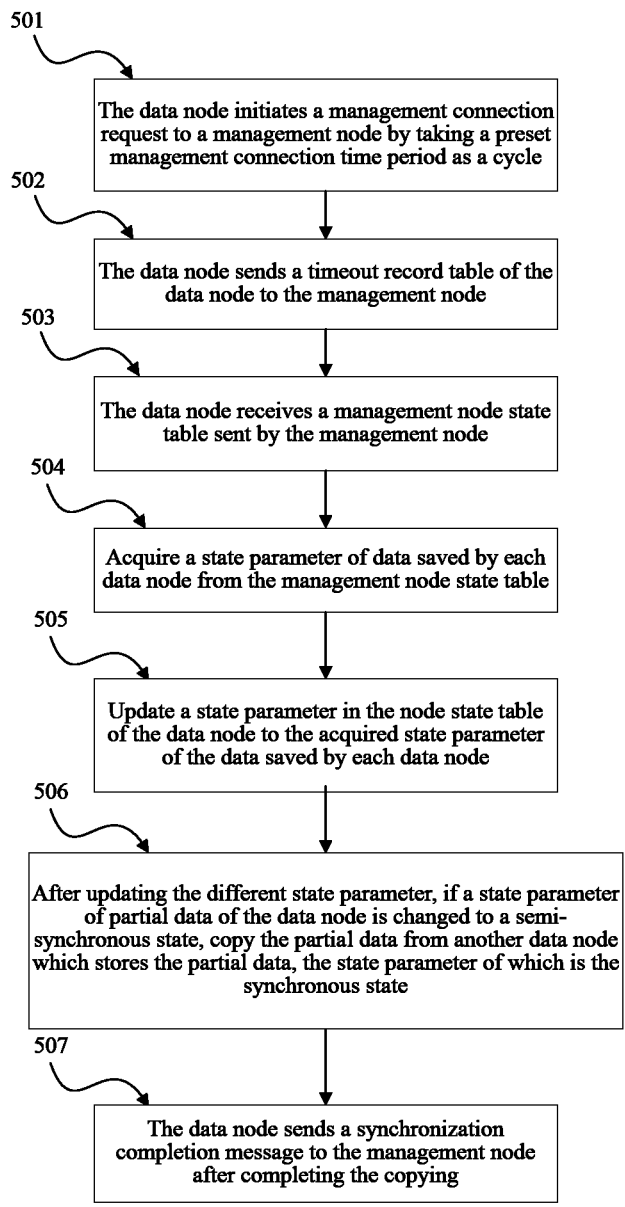
FIG. 5 is a flow chart of an operation method for interaction between a data node and a management node in Embodiment 2 of the present invention.

In addition to performing the read and write operations and exception handling, the data node further needs to connect to and exchange information with the management node, as shown in FIG. 5, including the following steps.

501: The data node initiates a management connection request to the management node by taking a preset time period as a cycle.

The management node sets the management state parameter of the data node to the normal state after receiving the management connection request. When the number of consecutive connection failures of the management connection request reaches a preset connection failure counting threshold, the data node sets its own management state parameter to the connection interruption state.

502: The data node sends the timeout record table of the data node to the management node.

After the management connection request is received by the management node, the data node sends the timeout record table of the data node to the management node. The management node receives the timeout record table of the data node, acquires the number of timeouts of the data node from the time record table, and modifies state parameters of all data of the data node reaching a timeout threshold to the asynchronous state, and records the asynchronous state in a management node state table.

As an implementation manner in actual application, the timeout record table sent by the data node may further include: a timeout ratio within a preset timeout record time period; the timeout ratio refers to a ratio of the total number of timeouts of the data node to the number of connection requests initiated by the data node to other data nodes within the preset timeout record time period. After acquiring the timeout ratio, the management node compares the timeout ratio with the timeout threshold. For a data node with a timeout ratio that is greater than or equal to the timeout threshold, the management node changes state parameters of all its data to the synchronous state. Furthermore, the management node further dynamically adjusts the state parameter according to a preset node number threshold S. For example, if the number of all data nodes which store data h whose state parameters are the synchronous and semi-synchronous states is less than the node number threshold S, the management node acquires a data node with the minimum timeout ratio (that is, the ratio of the total number of timeouts of the data node to the number of connection requests initiated by the data node to other data nodes within the preset timeout record time period is the minimum) from all data nodes which save data h whose state parameters are the asynchronous state, and changes a state parameter of data h stored by the data node to the semi-synchronous state in the management node state table.

The node number threshold S is preset in the distributed data storage system. The node number threshold S is generally smaller than a copy threshold N. Because the overall operating performance and real-time capability of the system should be taken into account, the value of the node number threshold S should not be too great; meanwhile, because the overall disaster tolerance capability of the system should be taken into account, the value of the node number threshold S should also not be too small. In general, for different systems, an optimum S value may be obtained through actual measurement or simulation experiment. When the number of data nodes which store data h whose state parameters are the synchronous state reaches the node number threshold S, the management node suspends an operation of generating a new synchronous state, so as to maintain the node number threshold S.

503: The data node receives a management node state table sent by the management node.

504: Acquire a state parameter of data saved by each data node from the management node state table.

After executing the change of the state parameter of the data stored by the data node as described in step 502, the management node sends the changed management node state table to the data node. At this time, a state parameter acquired by the data node from the management node state table may be different from a state parameter recorded in the node state table of the data node itself, so it is necessary to update the state parameter.

505: Update the state parameter in the node state table of the data node to the acquired state parameter of the data saved by each data node.

When the state parameter of the data of each data node acquired from the management node state is different from the state parameter of the data of each data node in the node state table of the data node, the different state parameter in the node state table is updated to the state parameter of the data of each data node acquired from the management node state table.

506: After the different state parameter is updated, if a state parameter of partial data of the data node is changed to the semi-synchronous state, copy the partial data from another data node which stores the partial data, the state parameter of which is the synchronous state.

The data node copies the partial data from another data node, so that the partial data saved by the data node can be restored from the semi-synchronous state to the synchronous state.

In actual cases, if the another data node which stores the partial data, the state parameter of which is the synchronous state, does not exist, connection is performed to all data nodes storing the partial data, so as to acquire the partial data of the latest version to perform copying.

507: The data node sends a synchronization completion message to the management node after completing the copying.

After receiving the synchronization completion message, the management node determines whether to change the state parameter of the partial data of the data node to the synchronous state.

For example, a data node H sends the synchronization completion message to the management node after completing copying data h. The management node determines, according to its own management node state table, whether the total number of all the data nodes which store the data h whose state parameters are the synchronous state and the semi-synchronous state reaches the node number threshold S. If the node number threshold S is not reached, a synchronization confirmation message is sent to the data node H, so that the data node H changes the state parameter of data h stored by the data node H itself to the synchronous state; if the node number threshold S is reached, a synchronization ending message is sent to the data node H, so that the data node H maintains the state parameter of the data h saved by the data node H itself to be the semi-synchronous state. In addition, when the data node copies the partial data, if the state parameter of the partial data saved by the data node is changed to the synchronous state at this time, or a management state of the data node is changed to the connection interruption state, the current copy action is ended.

In the operation method for a data storage system provided by the embodiment of the present invention, a state parameter is allocated to data saved in a data node, and the data with state parameters being a synchronous state is read out as the latest data, thereby avoiding an operation of reading data from R nodes in the prior art, and enhancing the efficiency of a read operation; meanwhile, because the data of the latest version can be determined according to the state parameters, it is unnecessary to traverse the copies of the same data in different data nodes, thereby making it easier to implement a complicated condition query. Furthermore, by introducing the management node to handle exceptional situations, such as connection timeout, in the distributed data storage system, the overall availability of the system is enhanced.

Embodiment 3

Figure 6:
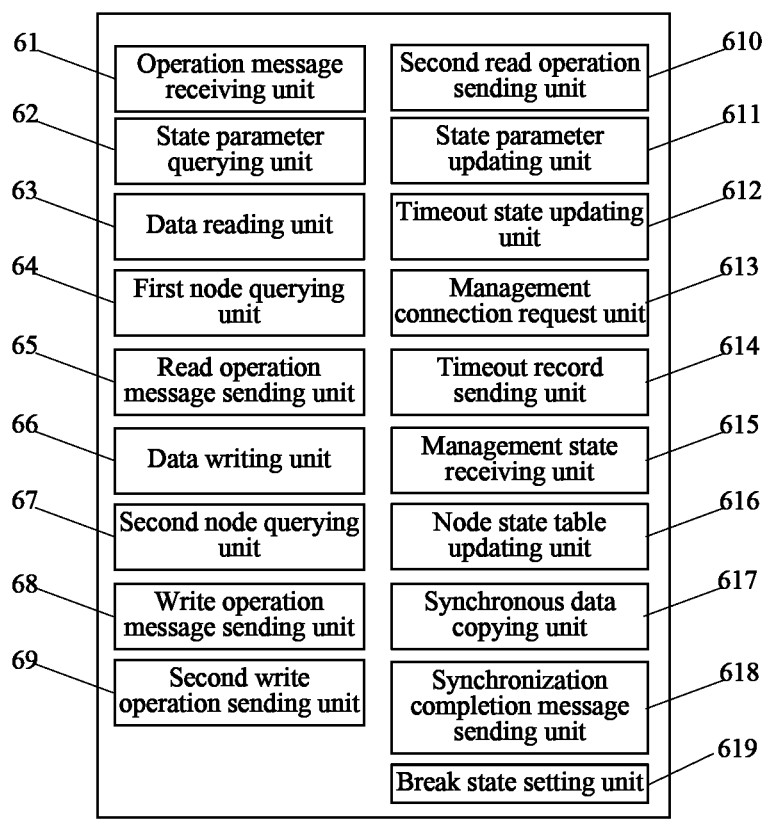
FIG. 6 is a block diagram of an operation apparatus for a data storage system in Embodiment 3 of the present invention.

An embodiment of the present invention provides an operation apparatus for a data storage system; as shown in FIG. 6, the apparatus includes: an operation message receiving unit 61, a state parameter querying unit 62, a data reading unit 63, a first node querying unit 64, a read operation message sending unit 65, a data writing unit 66, a second node querying unit 67, a first write operation sending unit 68, a second write operation sending unit 69, a second read operation sending unit 610, a state parameter updating unit 611, a timeout state updating unit 612, a management connection request unit 613, a timeout record sending unit 614, a management state receiving unit 615, a node state table updating unit 616, a synchronous data copying unit 617, a synchronization completion message sending unit 618 and a connection interruption state setting unit 619.

Figure 7:
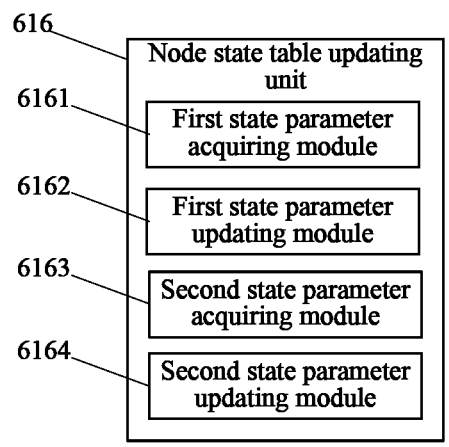
FIG. 7 is a block diagram of a node state table updating unit in Embodiment 3 of the present invention.

Furthermore, the node state table updating unit 616 further includes: a first state parameter acquiring module 6161, a first state parameter updating module 6162, a second state parameter acquiring module 6163, and a second state parameter updating module 6164, as shown in FIG. 7.

The operation message receiving unit 61 is configured to receive a data operation message which carries a data operation type and a data object of an operation. The state parameter querying unit 62 is configured to query a state parameter of the data object, where the state parameter is allocated to a data node by a management node, including a synchronous state, a semi-synchronous state and an asynchronous state. The state parameter querying unit 62 is further configured to query the state parameter of the data object when a management state parameter of the data node is a normal state. The data reading unit 63 is configured to, when the state parameter is the synchronous state and the operation type is a read operation, read the data object stored by the data node. The first node querying unit 64 is configured to, when the state parameter is the semi-synchronous state or the asynchronous state and the operation type is a read operation, query state parameters being the synchronous state from a node state table saved by the data node and acquire other data nodes with the state parameters being the synchronous state. The read operation message sending unit 65 is configured to send a read operation message to one data node among the other data nodes, where the read operation message includes the data object, so that the other data nodes read the data object after receiving the read operation message. The data writing unit 66 is configured to, when the state parameter is the synchronous state and the operation type is a write operation, write the object data stored by the data node. The second node querying unit 67 is configured to, when the state parameter is the semi-synchronous state or the asynchronous state and the operation type is a write operation, query state parameters being the synchronous state from a node state table saved by the data node and acquire other data nodes with the state parameters being the synchronous state. The first write operation sending unit 68 is configured to send a first write operation message to one data node among the other data nodes with the state parameters being the synchronous state after the other data nodes with the state parameters being the synchronous state are acquired, so that the other data nodes write the data object after receiving the first write operation message. The second write operation sending unit 69 is configured to, after the data node or the one data node among the other data nodes with the state parameters being the synchronous state completes writing of the data object, send a second write operation message to all other data nodes which save the data object, the state parameter of which is the synchronous state, the semi-synchronous state or the asynchronous state, so that all the other data nodes write the data object. The second read operation sending unit 610 is configured to, after a management state exception message returned by the one data node because the management state parameter is a connection interruption state is received within a preset first waiting time segment, send the read operation message to another data node among the other data nodes. The state parameter updating unit 611 is configured to, when an update state exception message returned by the one data node because the state parameter of the data object is not the synchronous state is received within the preset first waiting time period, update a state parameter of the data object of the one data node recorded in the node state table of the data node, and after updating of the state parameter is completed, send the read operation message to another data node among the other data nodes. The timeout state updating unit 612 is configured to, when a response of the one data node is not received within the first waiting time period, increase the number of timeouts of the one data node by 1 in a timeout record table stored by the data node.

When interconnecting to the management node, the management connection request unit 613 is configured to initiate a management connection request to the management node by taking a preset time period as a cycle. The timeout record sending unit 614 is configured to send the timeout record table of the data node to the management node after the management connection request is received by the management node. The management state receiving unit 615 is configured to, after the management connection request is received by the management node, receive a management node state table sent by the management node. The node state table updating unit 616 is configured to update the node state table of the data node according to the management node state table.

The first state parameter acquiring module 6161 in the node state table updating unit 616 is configured to acquire a state parameter of the data object of the one data node from the update state exception message. The first state parameter updating module 6162 is configured to change the state parameter of the data object recorded in the node state table to the state parameter of the data object acquired from the update state exception message.

The second state parameter acquiring module 6163 in the node state table updating unit 616 is configured to acquire, from the management node state table, a state parameter of data saved by each data node. The second state parameter updating module 6164 is configured to, when the acquired state parameter of the data saved by each data node is different from the state parameter in the node state table of the data node, update the state parameter in the node state table of the data node to the acquired state parameter of the data saved by each data node.

Furthermore, the synchronous data copying unit 617 is configured to, after the node state table updating unit 616 updates the node state table of the data node, and when a state parameter of partial data of the data node is changed to the semi-synchronous state, copy the partial data from another data node which stores the partial data, the state parameter of which is the synchronous state. The synchronization completion message sending unit 618 is configured to send a synchronization completion message to the management node after copying of the partial data is completed. The connection interruption state setting unit 619 is configured to, when the number of consecutive connection failures of the management connection request initiated by the data node to the management node reaches a preset connection failure counting threshold, set the management state parameter of the data node itself to the connection interruption state.

For a case of other related functions of the operation apparatus for a data storage system provided by the embodiment of the present invention, reference may be made to the foregoing descriptions of Embodiment 1 and Embodiment 2, and the details will not be described here again.

In the operation apparatus for a data storage system provided by the embodiment of the present invention, a state parameter is allocated to data saved in a data node, and the data with the state parameter being a synchronous state is read out as the latest data, thereby avoiding an operation of reading the data from R nodes, and enhancing the efficiency of a read operation, as well as making it easier to implement a complicated condition query. Furthermore, the embodiment of the present invention introduces the management node, and may handle exceptional situations such as connection timeout in the distributed data storage system, thereby enhancing the overall availability of the system.

Through the foregoing description of the embodiments, persons skilled in the art can clearly understand that the present invention may be implemented by software plus necessary universal hardware, and definitely may also be implemented by hardware, but in many cases, the former is a preferred implementation manner. Based on such understanding, the essence of the technical solutions of the present invention, or the part contributing to the prior art may be implemented in the form of a software product. The computer software product is stored in a readable storage medium, for example, a floppy disk, a hard disk, or an optical disk of the computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. An operation method for a data storage system including a management node and a plurality of data nodes, comprising:
   receiving, by a first data node of the plurality of data nodes, a data operation message, wherein the data operation message carries a data operation type and information of a data object;
   querying, by the first data node, a state parameter of the data object, wherein the state parameter is allocated to the first data node by the management node, the state parameter is used to indicate whether the data object is updated to a latest version;
   acquiring, by the first data node, information of a second data node storing the data object with a state parameter indicating that the data object is updated to the latest version from a node state table saved by the first data node when the state parameter indicates the data object in the first node is not updated to the latest version, wherein the node state table records data saved by each data node and a state parameter corresponding to the saved data; and
   sending, by the first data node, a read operation message to the second data node to read the data object from the second data node when the operation type is a read operation, wherein the read operation message comprises the information of the data object.

2. The method according to claim 1, after the first data node sends the read operation message to the second data node, further comprising:
   sending, by the first data node, the read operation message to a third data node storing the data object with a state parameter indicating that the data object is updated to the latest version when a management state exception message returned by the second data node is received within a preset first waiting time period, wherein the management state exception message indicates the second data node is in a connection interruption state.

3. The method according to claim 2, further comprising:
   sending, by the first data node, the timeout record table of the first data node to the management node to update a management node state table, wherein state parameters of all data objects reaching a timeout threshold in the first data node is updated in the updated management node state table to indicate the data objects is not updated to a latest version;
   receiving, by the first data node, the updated management node state table sent by the management node; and
   updating, by the first data node, the node state table of the first data node according to the updated management node state table.

4. The method according to claim 3, after the updating the node state table of the first data node, further comprising:
   when a state parameter of another data object of the first data node is changed to indicate the another data object is not updated to a latest version, copying, by the first data node, the another data object from a fourth data node which stores the another data object, wherein the state parameter of the another data object in the fourth data node is updated to a latest version; and
   sending, by the first data node, a synchronization completion message to the management node to change the state parameter of the another data object of the first data node to indicate the another data object in the first data node is updated to the latest version in the management node state table.

5. The method according to claim 3, further comprising:
when the number of consecutive connection failures of a management connection request initiated by the first data node to the management node reaches a preset connection failure counting threshold, setting, by the first data node, a management state parameter of the first data node itself to a connection interruption state.

6. The method according to claim 1, further comprising:
sending, by the first data node, a first write operation message to a fifth data node storing the data object with a state parameter indicating that the data object in the fifth data node is updated to the latest version to write the data object in the fifth data node when the operation type is a write operation, wherein the first write operation message comprises the data object.

7. The method according to claim 6, further comprising:
sending, by the fifth data node, a second write operation message to all other data nodes which save the data object to write the data object after the fifth data node completes writing of the data object.

8. The method according to claim 1, after the first data node sends the read operation message to the second data node, further comprising:
updating, by the first data node, a state parameter of the data object of the second data node recorded in the node state table of the first data node when an update state exception message returned by the second data node is received within a preset first waiting time period, wherein the update state exception message indicates the data object in the second data node is not updated to the latest version; and
sending the operation message to a third data node storing the data object with a state parameter indicating that the data object is updated to the latest version.

9. The method according to claim 8, wherein the updating the state parameter of the data object of the second data node recorded in the node state table of the first data node comprises:
acquiring, by the first data node, a new state parameter of the data object of the second data node from the update state exception message returned by the second data node, wherein the update state exception message indicates the data object in the second data node is not updated to the latest version; and
changing, by the first data node, the state parameter of the data object of the second data node recorded in the node state table to the new state parameter of the data object.

10. The method according to claim 1, after the first data node sends the read operation message to the second data node, further comprising:
increasing the number of timeouts of the second data node by 1 in a timeout record table stored by the first data node when a response of the second data node is not received within a first waiting time period.

11. A first data node included in a data storage system, comprising:
a processor; and
a non-transitory computer-readable storage medium coupled to the processor and storing programming instructions for execution by the processor, the programming instructions instruct the processor to:
receive a data operation message, wherein the data operation message carries a data operation type and information of a data object;
query a state parameter of the data object, wherein the data parameter is allocated to the first data node by a management node in the data storage system, the state parameter is used to indicate whether the data object is updated to a latest version
acquire information of a second data node storing the data object with a state parameter indicating that the data object is updated to the latest version from a node state table saved by the first data node when the state parameter indicates the data object in the first node is not updated to the latest version, wherein the data storage system comprises a plurality of data nodes, and wherein the node state table records data saved by each data node and a state parameter corresponding to the saved data; and
send a read operation message to the second data node to read the data object from the second data node when the operation type is a read operation, wherein the read operation message comprises the information of the data object.

12. The first data node according to claim 11, after sends the read operation message to the second data node, the programming instructions instruct the processor further to:
send the read operation message to a third data node storing the data object with a state parameter indicating that the data object is updated to the latest version when a management state exception message returned by the second data node is received within a preset first waiting time period, wherein the management state exception message indicates the second data node is in a connection interruption state.

13. The first data node according to claim 11, wherein the programming instructions instruct the processor further to:
acquire a new state parameter of the data object of the second data node from an update state exception message returned by the second data node, wherein the update state exception message indicates the data object in the second data node is not updated to the latest version;
change the state parameter of the data object of the second data node recorded in the node state table to the new state parameter of the data object; and
sending the operation message to a third data node storing the data object with a state parameter indicating that the data object is updated to the latest version.

14. The first data node according to claim 13, the programming instructions instruct the processor further to:
when the number of consecutive connection failures of a management connection request initiated by the first data node to the management node reaches a preset connection failure counting threshold, set the management state parameter of the first data node itself to a connection interruption state.

15. The first data node according to claim 11, the programming instructions instruct the processor further to:
send a first write operation message to a fifth data node storing the data object with a state parameter indicating that the data object in the fifth data node is updated to the latest version to write the data object in the fifth data node when the operation type is a write operation, wherein the first write operation message comprises the data object.

16. The first data node according to claim 15, the programming instructions instruct the processor further to:
after fifth data node completes writing of the data object, send a second write operation message to all other data nodes which save the data object to write the data object.

17. The first data node according to claim 11, after sends the read operation message to the second data node, the programming instructions instruct the processor further to:
increasing the number of timeouts of the second data node by 1 in a timeout record table stored by the first data node when a response of the second data node is not received within a first waiting time period.

18. The first data node according to claim 17, the programming instructions instruct the processor further to:
send the timeout record table of the first data node to the management node to update a management node state table, wherein state parameters of all data reaching a timeout threshold in the first data node is updated in the updated management node state table to indicate the data object is not updated to a latest version;
receive the updated management node state table sent by the management node; and
update the node state table of the first data node according to the updated management node state table.

19. The first data node according to claim 18, after updating the node state table of the first data node, the programming instructions instruct the processor further to:
when a state parameter of another data object of the first data node is changed to indicate the another data object is not updated to a latest version, copy the another data object from a fourth data node which stores the another data object, wherein the state parameter of the another data object in the fourth data node indicates the another data object in the fourth data node is updated to a latest version; and
send a synchronization completion message to the management node to change the state parameter of the another data object of the first data node to indicate the another data object in the first data node is updated to the latest version in the management node state table.

20. A computer program product, comprising computer executable instructions stored on a non-transitory computer-readable medium, wherein when the instructions are executed by a processor of a first data node in a data storage system including a management node and a plurality of data nodes, causes the processor to:
receive a data operation message, wherein the data operation message carries a data operation type and information of a data object;
query a state parameter of the data object, wherein the data parameter is allocated to the first data node by the management node, the state parameter is used to indicate whether the data object is updated to a latest version;
acquire information of a second data node storing the data object with a state parameter indicating that the data object is updated to the latest version from a node state table saved by the first data node when the state parameter indicates the data object in the first node is not updated to the latest version, wherein the node state table records data saved by each data node and a state parameter corresponding to the saved data; and
send a read operation message to the second data node to read the data object from the second data node when the operation type is a read operation, wherein the read operation message comprises the information of the data object.

21. The computer program product according to claim 20, after the first data node sends the read operation message to the second data node, when the instructions are executed by a processor, causes the processor to:
send the read operation message to a third data node storing the data object with a state parameter indicating that the data object is updated to the latest version when a management state exception message returned by the second data node is received within a preset first waiting time period, wherein the management state exception message indicates the second data node is in a connection interruption state.

22. The computer program product according to claim 21, when the instructions are executed by a processor, causes the processor to:
send a timeout record table of the first data node to the management node to update a management node state table, wherein state parameters of all data objects reaching a timeout threshold in the first data node is updated in the updated management node state table to indicate the data objects is not updated to a latest version;
receive the updated management node state table sent by the management node; and
update the node state table of the first data node according to the updated management node state table.

23. The computer program product according to claim 22, after updating the node state table of the data node according to the management node state table, when the instructions are executed by a processor, causes the processor to:
when a state parameter of another data object of the first data node is changed to indicate the another data object is not updated to a latest version, copy the another data object from a fourth data node which stores the another data object, wherein the state parameter of the another data object in the fourth data node indicates the another data object in the fourth data node is updated to a latest version; and
send a synchronization completion message to the management node to change the state parameter of the another data object of the first data node to indicate the another data object in the first data node is updated to the latest version in the management node state table.

24. The computer program product according to claim 22, when the instructions are executed by a processor, causes the processor to:
when the number of consecutive connection failures of a management connection request initiated by the first data node to the management node reaches a preset connection failure counting threshold, set the management state parameter of the first data node itself to a connection interruption state.

25. The computer program product according to claim 20, when the instructions are executed by a processor, causes the processor to:
send a first write operation message to a fifth data node storing the data object with a state parameter indicating that the data object in the fifth data node is updated to the latest version to write the data object in the fifth data node when the operation type is a write operation, wherein the first write operation message comprises the data object.

26. The computer program product according to claim 25, when the instructions are executed by a processor, further causes the processor to:
send a second write operation message to all other data nodes which save the data object to write the data object after the fifth data node completes writing of the data object.

27. The computer program product according to claim 20, after the first data node sends the read operation message to the second data node, when the instructions are executed by a processor, causes the processor to:
  update a state parameter of the data object of the second data node recorded in the node state table of the first data node when an update state exception message returned by the second data node is received within a preset first waiting time period, wherein the update state exception message indicates the data object in the second data node is not updated to the latest version; and
  send the read operation message to a third data node storing the data object with a state parameter indicating that the data object is updated to the latest version.

28. The computer program product according to claim 20, after the first data node sends the read operation message to the second data node, when the instructions are executed by a processor, further causes the processor to:
  increase the number of timeouts of the second data node by 1 in a timeout record table stored by the first data node when a response of the second data node is not received within a first waiting time period.

\* \* \* \* \*

UNITED STATES PATENT AND TRADEMARK OFFICE
CERTIFICATE OF CORRECTION

PATENT NO. : 9,639,588 B2  
APPLICATION NO. : 14/093124  
DATED : May 2, 2017  
INVENTOR(S) : Shi Cheng Page 1 of 1

It is certified that error appears in the above-identified patent and that said Letters Patent is hereby corrected as shown below:

Foreign Patent Documents, Page 2, "CN 101826073 A 08/2010" should read:
-- CN 101826073 A 09/2010 --.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*